(12) United States Patent
Lazar et al.

(10) Patent No.: US 8,188,886 B2
(45) Date of Patent: May 29, 2012

(54) METHOD AND SYSTEM FOR CONTROLLING PATH REDUNDANCY IN THE ACQUISITION OF UTILITY METER DATA

(75) Inventors: Mark Lazar, New Berlin, WI (US);
Randy Schultz, Fredonia, WI (US);
Dennis Webb, Glendale, WI (US);
Theresa Saadeh, Milwaukee, WI (US);
Jacob Graudenz, Bnei Brak (IL); Yacov Kirgner, Holon (IL); Anna Kirgner, Holon (IL); Yarum Locker, Givat Shmuel (IL); Erez Sharabi, Tel Aviv (IL)

(73) Assignee: Badger Meter, Inc., Milwaukee, WI (US)

( * ) Notice: Subject to any disclaimer, the term of this patent is extended or adjusted under 35 U.S.C. 154(b) by 972 days.

(21) Appl. No.: 12/182,269

(22) Filed: Jul. 30, 2008

(65) Prior Publication Data
US 2010/0026516 A1   Feb. 4, 2010

(51) Int. Cl.
*H04Q 9/00* (2006.01)
(52) U.S. Cl. .................................. 340/870.07
(58) Field of Classification Search ............... 340/870.07
See application file for complete search history.

(56) References Cited

U.S. PATENT DOCUMENTS

| | | | |
|---|---|---|---|
| 4,940,976 A | 7/1990 | Gastouniotis et al. | |
| 5,438,329 A | 8/1995 | Gastouniotis et al. | |
| 5,673,252 A | 9/1997 | Johnson et al. | |
| 5,963,146 A | 10/1999 | Johnson et al. | |
| 6,137,423 A | 10/2000 | Glorioso et al. | |
| 6,172,616 B1 | 1/2001 | Johnson et al. | |
| 6,351,223 B1 | 2/2002 | DeWeerd et al. | |
| 6,373,399 B1 | 4/2002 | Johnson et al. | |
| 6,653,945 B2 | 11/2003 | Johnson et al. | |
| 7,400,264 B2 | 7/2008 | Boaz | |
| 2005/0086182 A1 | 4/2005 | Nagy et al. | |
| 2005/0179561 A1* | 8/2005 | Osterloh et al. | 340/870.02 |
| 2005/0275527 A1* | 12/2005 | Kates | 340/539.22 |
| 2006/0239333 A1 | 10/2006 | Albert et al. | |
| 2008/0259844 A1* | 10/2008 | Richeson et al. | 370/328 |

\* cited by examiner

*Primary Examiner* — Jared Fureman
*Assistant Examiner* — Scott Bauer
(74) *Attorney, Agent, or Firm* — Boyle Fredrickson, S.C.

(57) ABSTRACT

A method and system by which certain radio transmitters are assigned to certain reception nodes for the purpose of transmitting metering data derived from a plurality of utility meters to a system management computer. The reception nodes are configured to receive and process data transmissions only from those transmitters with data paths assigned to particular reception nodes, and to ignore data transmissions from non-listed transmitters, thereby assuring that on a continuous basis, a majority of the transmitters will utilize only one data path. Lists may be formed for the transmitters and reception nodes in the system management computer and transmitted to the reception nodes. The status of data transmissions through the repeaters may also be uploaded to the system management computer for analysis of data update rates and data path redundancy.

16 Claims, 12 Drawing Sheets

| ID | ALIAS | DELAY | VERSION | DESCRIPTION |
|---|---|---|---|---|
| 4001 | 1 | | C1 | |
| 4002 | 2 | | C1 | |
| 4003 | 3 | | C1 | |
| 4004 | 4 | | C1 | |
| 4005 | 5 | | C1 | |
| 4095 | ? | | | |
| 0 | C | | | |
| | | | | |

[ADD] [DELETE] [PRINT]

[EXIT]

FIG. 4

☐ INITIATE CALL

COLLECTOR        ANYTOWN
CALL COLLECTOR   TELEPHONE
FILE TYPE        CURRENT
FILE NAME        AT1.TXT
FROM DOWNLOAD    11/25/2004 13:58
TO DOWNLOAD      11/25/2004 13:58

[OK] [EXIT]

☐ TRANSMITTERS STATUS – ANYTOWN — 29 ☒

DOWNLOAD: FROM [11/25/2004 13:58 ▼] TO [11/25/2004 14:15 ▼] [OK] — 29a, 29c

| AMR | TRANS. | LAST Rx | MAX Rx | TOTAL Rx | DAYS W/O Rx | AVG. DAY | SUGGESTED | ACTUAL | CHOSEN | UPDATE COLLECTOR | STATUS | LAST UPDATE |
|---|---|---|---|---|---|---|---|---|---|---|---|---|
| 23-00001 | 16000000 | | | | | | | 2 | 2 | | | |
| 23-00002 | 16000001 | 11/25/2004 15:15 | 380 | 1458 | | 8 | C | C | C | ☐ | NOT DEFINED ON LIST | |
| 23-00003 | 16000002 | | | | 2 | | | C | C | ☐ | NOT DEFINED ON LIST | |
| 23-00004 | 16000003 | 11/25/2004 15:18 | 375 | 1501 | | 9 | C | C | C | ☐ | NOT DEFINED ON LIST | |
| 23-00005 | 16000004 | | | | 2 | | | C | C | ☐ | NOT DEFINED ON LIST | |
| 23-00006 | 16000005 | | | | 2 | | | C | C | ☐ | NOT DEFINED ON LIST | |
| 23-00007 | 16000006 | 11/25/2004 15:14 | 408 | 1482 | | 7 | C | C | C | ☐ | NOT DEFINED ON LIST | |
| 23-00008 | 16000007 | 11/25/2004 15:18 | 389 | 1418 | | 7 | C | C | C | ☐ | NOT DEFINED ON LIST | |
| 23-00009 | 16000008 | 11/25/2004 15:18 | 375 | 1310 | | 8 | C | C | C | ☐ | NOT DEFINED ON LIST | |
| 23-00010 | 16000009 | 11/25/2004 15:14 | 372 | 1419 | | 8 | C | C | C | ☐ | NOT DEFINED ON LIST | |
| 23-00011 | 30016 | | | | 2 | | | C | C | ☐ | NOT DEFINED ON LIST | |
| 23-00012 | 30015 | | | | 2 | | | C | C | ☐ | NOT DEFINED ON LIST | |
| 23-00013 | 30018 | | | | 2 | | | C | C | ☐ | NOT DEFINED ON LIST | |
| 23-00014 | 30021 | | | | 2 | | | C | C | ☐ | NOT DEFINED ON LIST | |
| 23-00015 | 30022 | | | | 2 | | | C | C | ☐ | NOT DEFINED ON LIST | |
| 23-00016 | 30026 | | | | 2 | | | C | C | ☐ | NOT DEFINED ON LIST | |
| 23-00017 | 30027 | | | | 2 | | | C | C | ☐ | NOT DEFINED ON LIST | |
| 23-00018 | 30037 | | | | 2 | | | C | C | ☐ | NOT DEFINED ON LIST | |
| 23-00019 | 30014 | | | | 2 | | | C | C | ☐ | NOT DEFINED ON LIST | |
| 23-00020 | 30077 | | | | 2 | | | C | C | ☐ | NOT DEFINED ON LIST | |
| 23-00021 | 30078 | | | | 2 | | | C | C | ☐ | NOT DEFINED ON LIST | |
| 23-00022 | 30079 | | | | 2 | | | C | C | ☐ | NOT DEFINED ON LIST | |
| 23-00023 | 30081 | | | | 2 | | | C | C | ☐ | NOT DEFINED ON LIST | |
| 23-00024 | 30082 | | | | 2 | | | C | C | ☐ | NOT DEFINED ON LIST | |
| 23-00025 | 30083 | | | | 2 | | | C | C | ☐ | NOT DEFINED ON LIST | |
| 23-00026 | 30084 | | | | 2 | | | C | C | ☐ | NOT DEFINED ON LIST | |

SELECTED TRANSMITTERS   [ACCEPT] — 29b   SELECT ALL — 29d   CLEAR ALL — 29e   SELECT DIFFERENT — 29f   [PRINT] [EXIT]

FIG. 7

☐ TRANSMITTERS STATUS – ANYTOWN ⟵ 29

DOWNLOAD: FROM [11/25/2004 13:58 ▸] TO [11/25/2004 14:15 ▸] [OK]
                                              29a                    29c

| AMR | TRANS. | LAST Rx | MAX Rx | TOTAL Rx | DAYS W/O Rx | AVG. DAY | SUGGESTED | ACTUAL | CHOSEN | UPDATE COLLECTOR | STATUS | LAST UPDATE |
|---|---|---|---|---|---|---|---|---|---|---|---|---|
| 23-00001 | 16000000 | 11/25/2004 15:14 | | | | | 3 | 2 | 2 | ☐ | NOT DEFINED ON LIST | |
| 23-00002 | 16000001 | 11/25/2004 15:15 | 380 | 1458 | | | 8 | C | C | ☐ | NOT DEFINED ON LIST | |
| 23-00003 | 16000002 | | | | 2 | | | C | C | ☐ | NOT DEFINED ON LIST | |
| 23-00004 | 16000003 | 11/25/2004 15:18 | 375 | 1501 | | | 9 | C | C | ☐ | NOT DEFINED ON LIST | |
| 23-00005 | 16000004 | | | | 2 | | | C | C | ☐ | NOT DEFINED ON LIST | |
| 23-00006 | 16000005 | | | | 2 | | | C | C | ☐ | NOT DEFINED ON LIST | |
| 23-00007 | 16000006 | 11/25/2004 15:14 | 408 | 1482 | | | 7 | C | 1 | ☑ | NOT DEFINED ON LIST | |
| 23-00008 | 16000007 | 11/25/2004 15:18 | 389 | 1418 | | | 7 | C | 2 | ☑ | NOT DEFINED ON LIST | |
| 23-00009 | 16000008 | 11/25/2004 15:18 | 375 | 1310 | | | 8 | C | C | ☐ | NOT DEFINED ON LIST | |
| 23-00010 | 16000009 | 11/25/2004 15:14 | 372 | 1419 | | | 6 | C | C | ☐ | NOT DEFINED ON LIST | |
| 23-00011 | 30016 | | | | 2 | | | C | C | ☐ | NOT DEFINED ON LIST | |
| 23-00012 | 30015 | | | | 2 | | | C | C | ☐ | NOT DEFINED ON LIST | |
| 23-00013 | 30018 | | | | 2 | | | C | C | ☐ | NOT DEFINED ON LIST | |
| 23-00014 | 30021 | | | | 2 | | | C | C | ☐ | NOT DEFINED ON LIST | |
| 23-00015 | 30022 | | | | 2 | | | C | C | ☐ | NOT DEFINED ON LIST | |
| 23-00016 | 30026 | | | | 2 | | | C | C | ☐ | NOT DEFINED ON LIST | |
| 23-00017 | 30027 | | | | 2 | | | C | C | ☐ | NOT DEFINED ON LIST | |
| 23-00018 | 30037 | | | | 2 | | | C | C | ☐ | NOT DEFINED ON LIST | |
| 23-00019 | 30014 | | | | 2 | | | C | C | ☐ | NOT DEFINED ON LIST | |
| 23-00020 | 30077 | | | | 2 | | | C | C | ☐ | NOT DEFINED ON LIST | |
| 23-00021 | 30078 | | | | 2 | | | C | C | ☐ | NOT DEFINED ON LIST | |
| 23-00022 | 30079 | | | | 2 | | | C | C | ☐ | NOT DEFINED ON LIST | |
| 23-00023 | 30081 | | | | 2 | | | C | C | ☐ | NOT DEFINED ON LIST | |
| 23-00024 | 30082 | | | | 2 | | | C | C | ☐ | NOT DEFINED ON LIST | |
| 23-00025 | 30083 | | | | 2 | | | C | C | ☐ | NOT DEFINED ON LIST | |
| 23-00026 | 30084 | | | | 2 | | | C | C | ☐ | NOT DEFINED ON LIST | |

SELECTED TRANSMITTERS    [ACCEPT]⟵29b    29d⟶SELECT ALL    [PRINT] [EXIT]
                                                 CLEAR ALL ⟵29e
                                         29f⟶SELECT DIFFERENT

SYSTEM MANAGEMENT

COLLECTOR  ANYTOWN

TRANSMITTERS STATUS

| | TOTAL TRANSMITTERS | ADDED TO LIST RECEIVED OK | NOT RECEIVED | Tx NOT UPDATED ON RPTR LIST | ILLEGAL DEFINITION | NOT DEFINED ON ANY LIST |
|---|---|---|---|---|---|---|
| TOTAL | 143 | | | | | 143 |
| SELECTED TO UPDATE | 2 | | | | | |

DETAILS

REPEATERS STATUS

| | TOTAL REPEATERS | OPEN | LIST | NEGATIVE | NO RESPONSE FROM RPTR |
|---|---|---|---|---|---|
| TOTAL | 5 | | | | 5 |
| SELECTED TO UPDATE | 5 | | | | 5 |

DETAILS

SYSTEM STATUS

MODE

REDUNDANCY    5%

UPDATE COLLECTOR    INITIATE CALL    SYSTEM LOG    EXIT

FIG. 11

| | | TRANSMITTERS STATUS | | | | |
|---|---|---|---|---|---|---|
| COLLECTOR | ANYTOWN ▷ | | | | | |
| | TOTAL TRANSMITTERS | ADDED TO LIST RECEIVED OK | NOT RECEIVED | Tx NOT UPDATED ON RPTR LIST | ILLEGAL DEFINITION | NOT DEFINED ON ANY LIST |
| TOTAL | 143 | 4 | | 2 | | 137 |
| SELECTED TO UPDATE | | | | | | |

DETAILS — 25

41

| | REPEATERS STATUS | | | | |
|---|---|---|---|---|---|
| | TOTAL REPEATERS | OPEN | LIST | NEGATIVE | NO RESPONSE FROM RPTR |
| TOTAL | 5 | | 4 | | 1 |
| SELECTED TO UPDATE | 1 | | | | 1 |

DETAILS — 26

27

SYSTEM STATUS
MODE
REDUNDANCY      5%

24 — SYSTEM LOG   INITIATE CALL   EXIT
23 — UPDATE COLLECTOR

METHOD AND SYSTEM FOR CONTROLLING PATH REDUNDANCY IN THE ACQUISITION OF UTILITY METER DATA

TECHNICAL FIELD

The field of the invention is data acquisition systems for collecting utility meter data, and more particularly systems including a network that uses stationary receivers and transmitters.

DESCRIPTION OF THE BACKGROUND ART

Johnson et al., U.S. Pat. Nos. 5,673,252, 5,963,146, 6,172,616, 6,373,399, and 6,653,945 describe a radio-based wireless communication network for sending utility metering data from a plurality of remote devices to a central data terminal through receivers and through intermediate data terminals.

U.S. Pat. No. 6,373,399 further describes an array of receiving stations arranged relative to the remote stations so that the messages from each remote station can be received by at least two and preferably four of the receiving stations. This provides a high level of duplication of messages, which is said to reduce the loss of messages and data.

Many attempts have been made in recent years to develop fixed base network Automatic Meter Reading ("AMR") systems for the reading of utility meters, such as water, gas, and electricity meters. In each such attempt, the objective has been to provide a level of radio coverage that ensures that all the service modules attached to meters can be read on a daily or more frequent basis, i.e. that the collection of data from the remote service modules is assured for any given period of time.

Fixed base radio networks of the prior art rely on physical placement of transmitters within the range of multiple receiving stations to collect data from remote service modules. It is not possible, however, to exactly define the coverage area of any given receiving station due to difference in terrain and other radio wave interference that may be present at any location. In the typical design for such systems, receiving stations are located such that the remote transmitter modules will be within the range of at least two receiving stations, thereby providing redundant data paths. These systems require the installation of an array of receiving stations arranged relative to the remote transmitters. As a result, the most of the remote transmitters are being received by two or more receiving stations. If there is a reception problem, the physical arrangement must be modified.

It is desired to provide an alternative to this system that would monitor and assure receptions from each transmitter, manage data paths and reduce the amount of duplicate message transmission needed to assure adequate update rates.

SUMMARY OF THE INVENTION

The invention is practiced in a method and system in which certain radio transmitters are assigned to certain radio reception nodes for the purpose of transmitting utility metering data from a plurality of transmitters to a data collector that receives data from a large plurality of transmitters distributed over a portion of service area.

The invention provides the ability to automatically monitor reception levels on an ongoing basis, and to configure the reception nodes to receive data transmissions only from those transmitters with data paths assigned to a particular receiver. Data transmissions from other transmitters are ignored, thereby ensuring that on a continuous basis, a majority of the transmitters will utilize only one data path to the data collector.

The data collector transfers the utility metering data to a computer for further processing for billing purposes. Lists of transmitters and receivers are formed in a computer and transmitted to the data collector and to the reception nodes. The status of data transmissions that are received by the reception nodes can be uploaded to the computer for analysis of data update rates and data path redundancy.

Data is collected from the transmitters at a high capacity data collector. To extend the range of the transmitters and the geographical coverage of a specific data collector, data can be collected through intermediate level receivers known as repeaters. These repeaters may each receive and re-transmit a large number of transmissions from a large plurality of transmitters over a selected time interval. As the data is received by the repeaters it is re-transmitted via radio signals to the data collector. As used herein, the term "reception node" refers to either a collector or a repeater.

The invention provides lists, contained in data files, that define which reception nodes are to receive and transmit the messages from which transmitters. Data transmissions from non-listed transmitters are ignored, meaning that the data is detected but is not transmitted or processed any further. This technique provides a method that makes it unnecessary to provide a large number of redundant data paths between the transmitters and the data collector, thereby reducing data transmissions from the intermediate level to the data collector.

The configuring of the data collectors and the receivers is performed through a computer which can upload data files from the data collector and download data files to the data collector. The data collector can also communicate data to configure the intermediate level repeaters.

The invention provides the capability for managing lists of active transmitters for each repeater. The invention also provides the ability to manage the list of any specific repeater, including the addition or deletion of active transmitters, resetting the list and accomplishing other functions.

One object of the invention is to set up a network with minimum data path redundancy while assuring good communications between the repeaters and the data collector.

Another object of the invention is to compensate for reception problems from a particular remote site by reassigning a transmitter to a different reception node.

An additional object of the invention is to provide a communications network which is designed as an automatic meter reading system.

A further object of the invention is to provide a communications network for collecting data from a large number of meters distributed over a geographical region, such as a town or municipality.

These and other objects and advantages of the invention will be apparent from the description that follows and from the drawings which illustrate embodiments of the invention, and which are incorporated herein by reference.

BRIEF DESCRIPTION OF THE DRAWINGS

FIGS. 4-12 are screen displays on a system management computer seen in FIG. 1.

DETAILED DESCRIPTION

Figure 1:
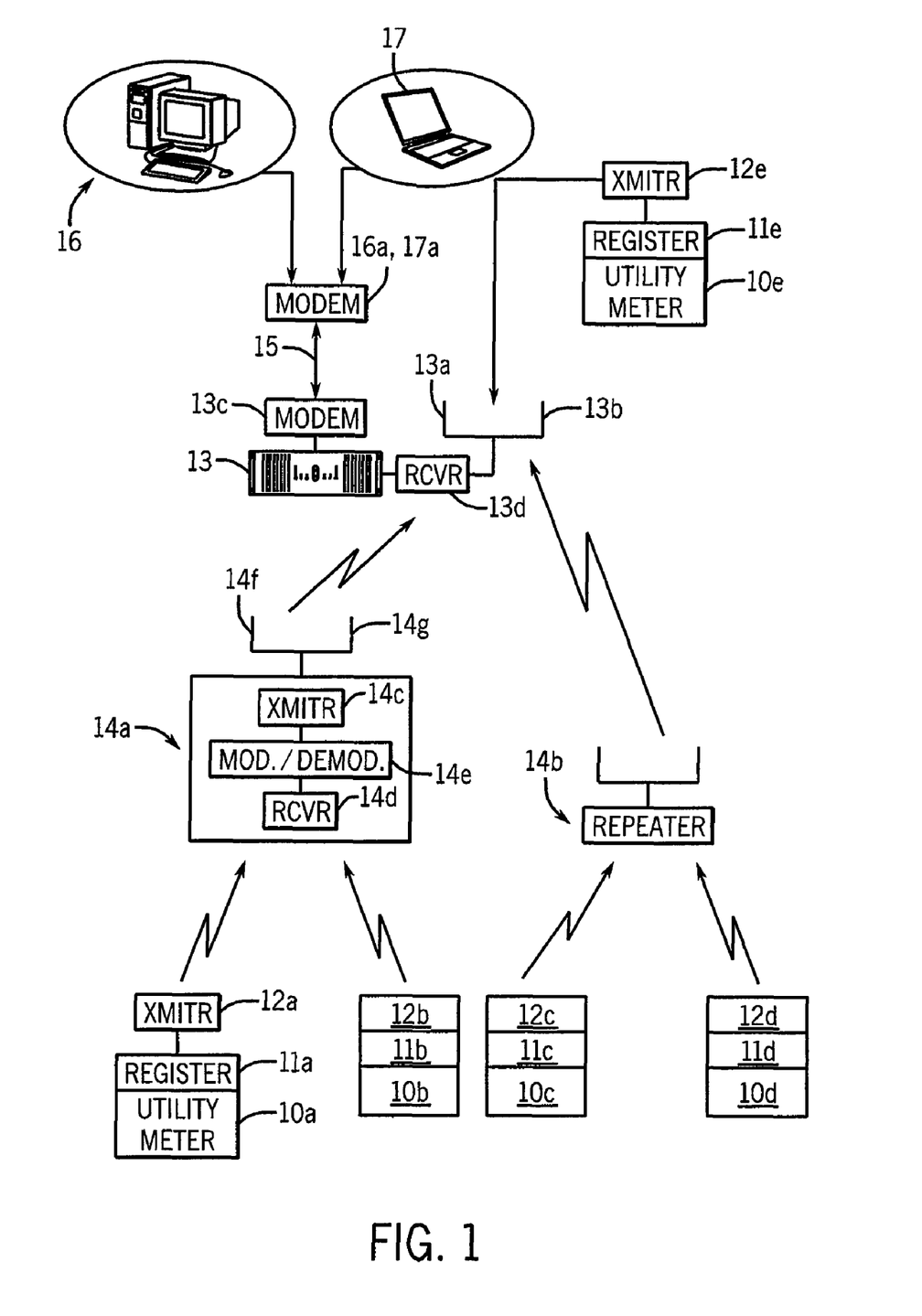
FIG. 1 is a block diagram of the network apparatus for practicing the method of the present invention.

Referring to FIG. 1, a group of utility meters 10a-10d are distributed at some distance apart at various sites of utility customers including residences, apartments, businesses or other locations. These locations are within a geographical service area, such as a town or municipality, where a utility, such as water, gas or electricity, is provided. The following description will be in relation to elements 10a-12a, with the understanding that elements 10b-10d, 11b-11d and 12b-12d represent additional units of the same description. In each assembly, a meter register 11a-11d is mounted on meters 10a-10d for converting meter revolutions to electrical signals representing units of consumption of the utility.

Examples of meter registers 11a-11d that can be used in include: 1) a pulse generating type which generates a raw pulse count in binary form and 2) an optical encoder type in which an analog position of several number wheels is converted to a digitized number representing a number of consumption units. The meter data is transmitted, in this example, from meter registers 11a-11d through wires to electronic transmitter modules 12a-12d as twenty (20) bits of information. It is also known in the art to integrate the transmitter modules and meter registers into a single unit.

In this embodiment, the modules 12a-12d have only a transmitter, which is operated periodically to transmit signals. In alternative embodiments, the transmitter modules 12a-12d can be interrogated or awakened periodically by an incoming signal and can respond by transmitting meter data to a receiver or reader.

As known in the art, the transmitter modules 12a-12d each include an antenna (not shown) for wireless transmission of data and at least one circuit board with solid state electronics including a microelectronic CPU, memory, and RF circuitry for converting digital data to RF signals for transmission. In this embodiment, the transmissions are initiated by the transmitter at predetermined intervals such as every three (3) hours. The meter data includes a transmitter serial number, which is unique to the transmitter. The message also includes the meter data, which can be a binary number of pulses or a digitized conversion of an analog number. This is followed by several bytes of transmitter status data showing various conditions at the meter, including leak detection status. Lastly, there is an error correction code, known as a CRC. The message data is scrambled for transmission using a hamming code.

In meter data networks, the reader or receiver for receiving signals from the transmitters 12a-12d can be fixed or mobile. In the present preferred embodiment the data collector 13 and the repeaters 14a, 14b are fixed; they do not change location. The data is transmitted from the transmitter via RF wireless signals either 1) directly to a data collector 13, in the case of transmitter 12e operating with meter register 11e and meter 10e or 2) to a repeater 14a, 14b in the case of transmitters 12a-12d.

To increase the coverage over a geographical service area, it is known to use repeaters 14a, 14b to extend the range from which a group of transmitters 12a-12d can be serviced by an individual collector 13. In the preferred embodiment, the communication is initiated by the transmitter 12a-12d or the repeater 14a, 14b and not by the data collector 13. The transmission is one-way and it is wireless.

The repeaters 14a, 14b have both a radio transmitter 14c and a radio receiver 14d. They may include modulating and demodulating circuitry 14e and other logic circuitry or a CPU (not shown) to perform other processing tasks or they may simply receive meter data signals from the transmitters 12a-12d located proximate the meters 10a-10d and use a transmitter 14c to relay the data in RF signals to a receiver or collector 13. In the present invention, the data collector 13 can receive and process data from up to eight thousand utility meters 10. The data collector 13 is connected through a modem 13c, the public telephone network 15 and a suitable modem 16a, 17a at the other end to a control center computer 16 or 17. Some systems will utilize multiple data collectors 13, thus replicating the portion of the system described below. Data can be collected from these additional data collectors 13 by one control center computer 16 or 17 of suitable capacity.

The present embodiment uses a dial-up communication and RS-232 network communication over a communication link 15 between the computer 16 or 17 and the data collector 13. In this embodiment the communication link is the common public switched telephone network (PSTN). In other embodiments, a wired or wireless network, or a combination of these, including communication through the Internet, can be used as the communication link 15. The computer 16 or 17 is located at the office of a utility or managing entity that has responsibility for collecting, analyzing and processing the utility meter data, so that utility consumption can be billed to the utility customers.

The repeaters 14a, 14b add data to the messages received from the transmitters 12a-12d. The messages from the repeaters 14a, 14b include a logic number or delay number that determines the timing of transmissions to the data collector 13 so as to avoid collisions with data coming from other repeaters. The repeater message also includes a repeater ID number. This number may not be unique within the entire system as repeaters in different areas may have the same ID number, but the data collector 13 will distinguish messages based on a combination of the repeater ID and the transmitter ID number considered together. The message also contains an antenna number and a signal strength number. As seen in FIG. 1, the data collector 13 and the repeaters 14a, 14b each have two antennas 13a, 13b, 14f, 14g and switch between these antennas according to the best detected signal strength of signals being received or are switched after a certain time interval. The messages from the repeater 14a, 14b also include all of the data received from the transmitters 12a-12d.

The messages are received via RF signals by a receiver portion 13d of the data collector 13. The data collector 13 is a DOS-programmable PC-based system that is designed to operate unattended in the area of operation. The data collector 13 has a CPU, a memory and other electronics equivalent to a personal computer (PC). It also has a port for connection of a local user interface computer (not shown) and a port for connection to a modem 13d and the telephone line 15.

Figure 3:
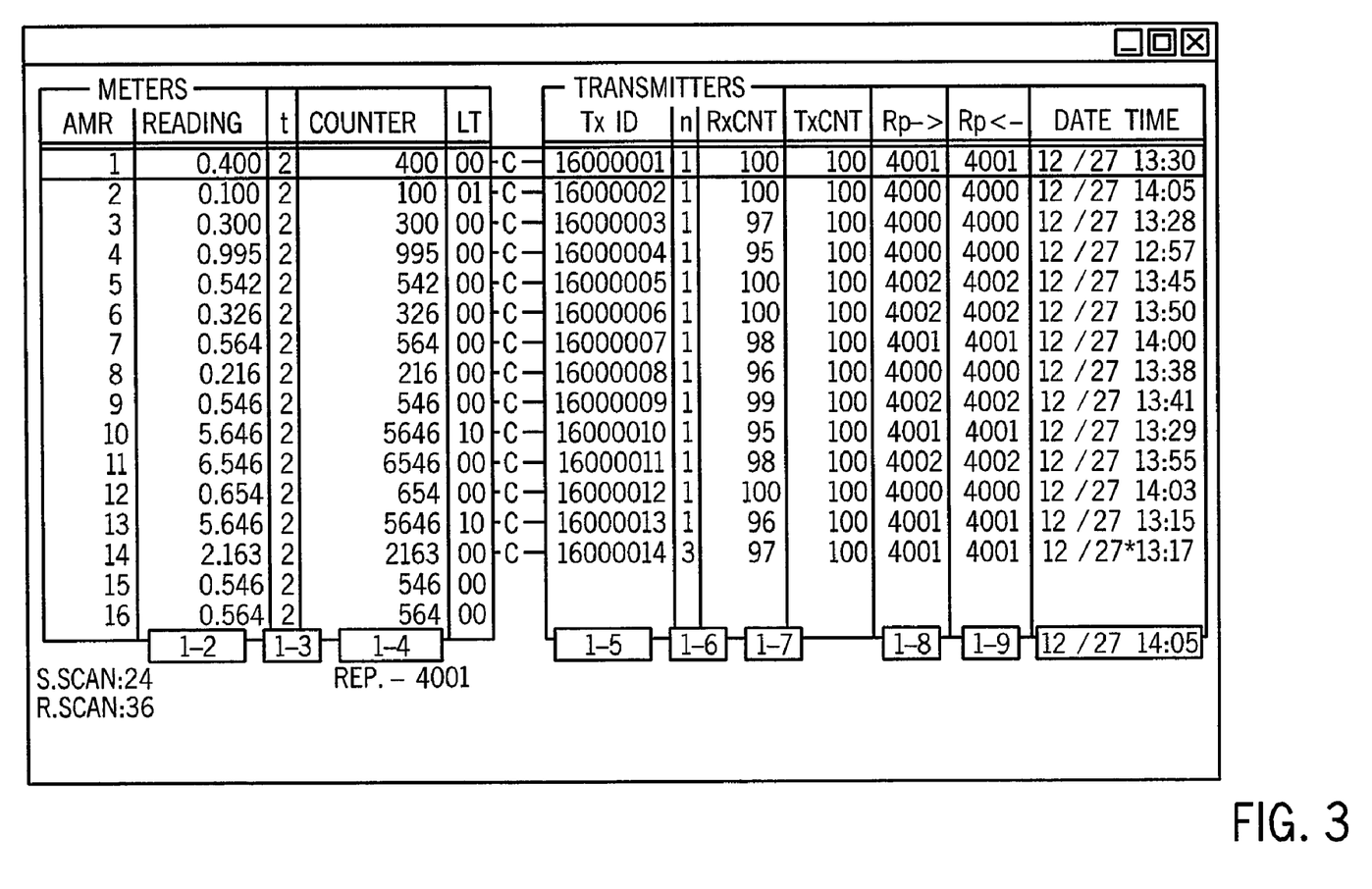
FIG. 3 is a screen display of data received from a data collector seen in FIG. 1.

FIG. 3 shows a snapshot of data stored in the data collector as can be displayed on a screen of a DOS-operating-system computer plugged into a communication port on the data collector 13. In the data collector 13, data is identified by the transmitter, TxID, from which it was received, and the repeater, Rp, from which it was received. The other data is defined in the following table of definitions:

TABLE 1

COLLECTOR DATA DEFINITIONS

| Term | Definition |
| --- | --- |
| AMR | Meter identification number. |
| Reading | Current meter reading. |
| T | Pulse resolution. |
| Counter | Current pulse count. |
| LT | Status information concerning leakage or tampering. |
| TxID | Transmitter identification. |
| N | Number of meters connected to transmitter. |
| RxCNT | Reception count. |
| TxCNT | Transmission count. |
| Rp-> | Repeater assignment received by collector. |
| Rp<- | Repeater assignment acknowledge by repeater. |
| Date Time | Date and time stamp of last transmission. |

At the bottom of the screen are function keys, F2-F9, which together with the conventional cursor keys can be used to navigate to any particular data item and edit that item.

This capability allows the transmitter numbers to be initialized or preset in the collector 13 to recognize messages from the transmitters with those ID numbers. The data collector 13 also receives condition status data about the transmitter 12a-12d and maintains certain condition status data regarding the data collector 13 itself.

A database of metering data is stored on the control center computer, which may be a non-portable computer 16 or a laptop computer 17 as seen in FIG. 1. This computer 16 or 17 runs application programs or routines including: 1) a database management system; 2) a file exporting utility application for exporting files of data from the database; and 3) an application by which a user can view a time-stamped snapshot of metering data in the control center computer and in the data collector 13. The database is provided with the capability of importing files data to be uploaded from the collector 13, and exporting files of data to be downloaded to the collector 13 and eventually to the repeaters 14a, 14b.

The control center computer 16 or 17 obtains data from the data collector 13 by dialing up the data collector 13 over the telephone network 15 and executing file transfers using a serial data, RS-232 protocol. In alternate embodiments, files can be uploaded and downloaded through the Internet.

Prior to running a system management program in the utility center computer 16 or 17, a number of transmitters 12 and repeaters 14 are placed in the field. The number of repeaters 14 is typically a small number compared to the number of transmitters 12.

Figure 2:
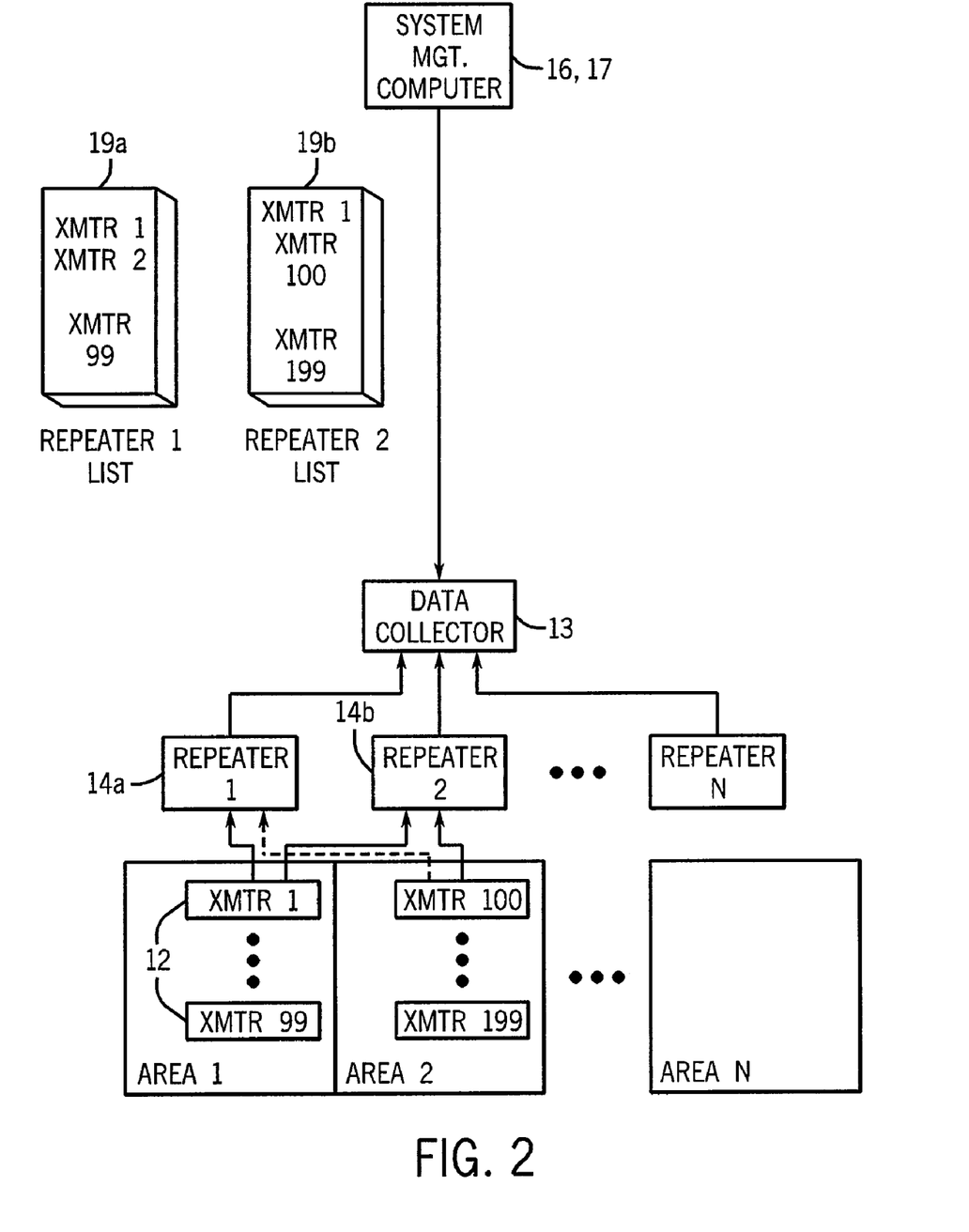
FIG. 2 is a block diagram illustrating management of path redundancy in the network of the present invention.

FIG. 2 illustrates how, for example, ninety-nine transmitters 12, further identified as XMTR 1-XMTR 99, can be distributed in a first portion of a service area, AREA 1, and one hundred transmitters 12, further identified as XMTR 100-XMTR 199, can be distributed in a second portion of a service area, AREA 2. Some of the transmitters 12, XMTR 1-XMTR 99, will transmit messages that are received by both the first repeater 14a, further identified as REPEATER 1, and the second repeater 14b, further identified as REPEATER 2. The number of one hundred transmitters per area is only exemplary; the repeaters can serve larger numbers of transmitters. It is also possible for transmitters, such as transmitter 12e to transmit directly to a data collector 13, when the transmitters are within suitable range. There can be additional service areas or portions of service areas served by repeaters in the system up to "N", where typically "N" is a number less than ten. When that many repeaters are in included in the system, an additional data collector should be considered.

The control center computer, 16 or 17, downloads lists (contained in data files) 19a, 19b to the data collector 13 which contain assignments of the transmitters to specific repeaters. These lists 19a, 19b are further downloaded to the repeaters 14a, 14b. Assignments are confirmed by data files uploaded to the control center computer 16 or 17. As a result, while a redundant data path may be allowed for XMTR 1 due to difficulties in receiving its transmissions at a particular repeater, redundant data paths are not allowed (represented by the dashed line) for XMTR 100 and other transmitters exhibiting normal update rates.

Figure 4:
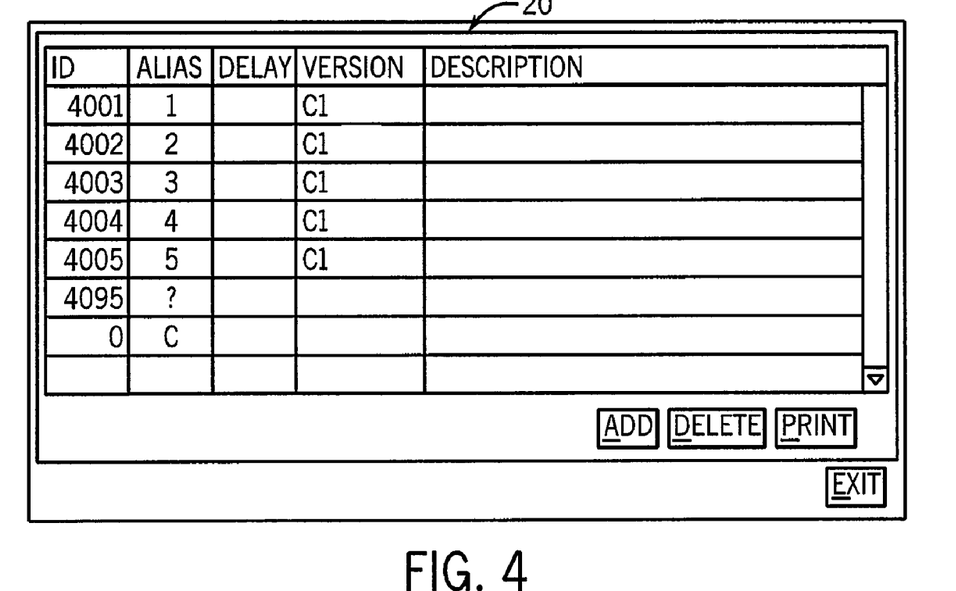

The invention is further implemented by executing a system management computer program in the utility center computer 16 or 17. The first step is to assign repeaters 14a, 14b to the collector 13 using a table in a screen display 20 seen in FIG. 4. In FIG. 4, five repeaters, with ID numbers from 4001 to 4005, and aliases from "1" to "5" are assigned to the data collector, C1. Repeaters can be added or deleted from the list. The table results in a file of data that can be downloaded to the data collector 13.

Figure 5:
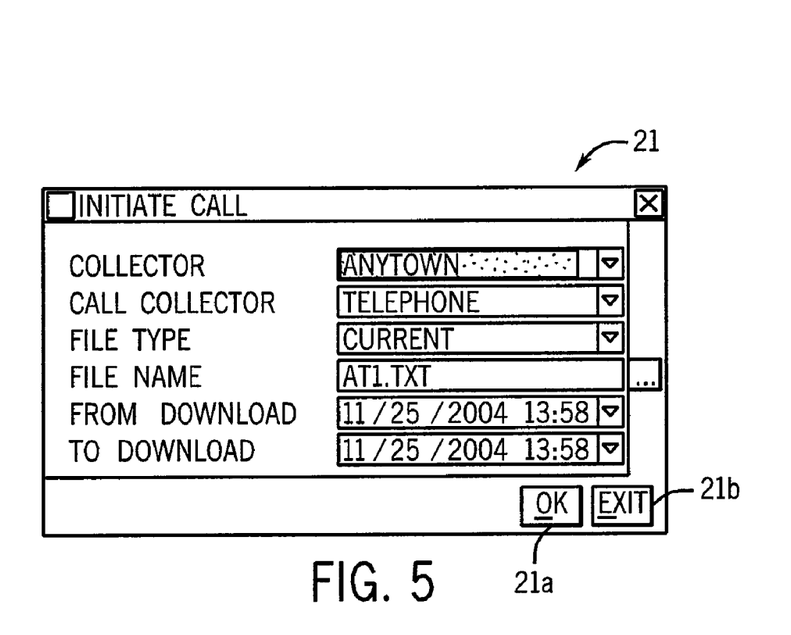

A call is initiated to the data collector 13 through the screen display 21 in FIG. 5 to download a data file such as described in relation to FIG. 4. An OK button 21a is actuated to initiate the call. The Exit button 21b is actuated to return to a previous screen without contacting the data collector 13. Once the call is initiated, a dialog box will be opened to display the status of the call and the progress of the download of data to the collector 13. A similar procedure is used to upload a data file with data from the repeaters and transmitters in the field.

The data typically received for a transmitter includes the following items seen in FIGS. 7 and 8

TABLE 2

TRANSMITTER STATUS DATA DEFINITIONS

| Term | Definition |
| --- | --- |
| AMR | A network identification number. |
| Trans. | A transmitter ID number. |
| Last Rx | A timestamp of the last received transmission. |
| Max Rx | Maximum receptions during a selected period for the reception node specified in the suggested column. |
| Total Rx | Total receptions. |
| Days w/o Rx | Number of days without any reception from a transmitter. |
| Avg/day | Average number of transmissions received per day for the selected period. |
| Suggested | The reception node assignment suggested by the System Management program. |
| Actual | The left-most part shows the current reception node assignment in the collection unit, the right-most part shows the current reception node last confirmed by the repeater. |

The "Last Rx" timestamp, the "Max Rx" and "Total Rx" reception numbers, the "Avg/day" reception number, and the "Days w/o Rx" reception number allow the monitoring of reception rates for individual meters.

Figure 6:
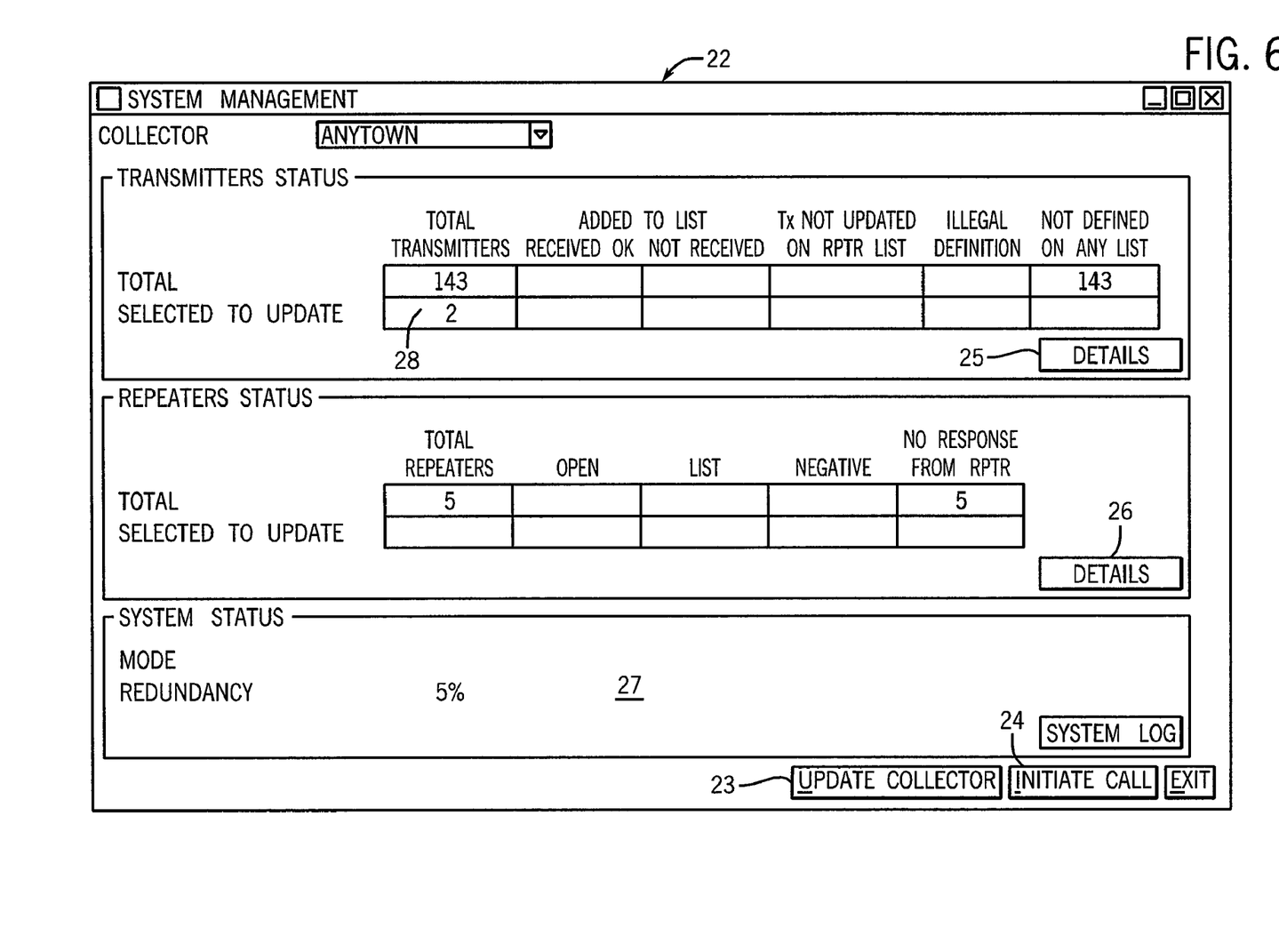

FIG. 6 shows a system management screen display 22 which is displayed for summarizing the number of transmitters and repeaters associated with a data collector 13, the number of transmitters selected for update in data box 28, the number of repeaters associated with a data collector 13 and the number of repeaters selected for update, when data is downloaded.

To download data, a call is placed by actuating the "Initiate Call" button 23 and then by actuating the "Update Collector"

button 24. There are also buttons 25, 26 for accessing details of the transmitter status and repeater status. There is also a calculation of transmission path redundancy in a display area 27.

When the detail button 25 is actuated, a Transmitters Status screen display 29 is seen as shown in FIG. 7. This screen shows recommended reception node assignments for the transmitters in the "Suggested" column 29*a*. These suggested assignments can be accepted by actuating the "Accept" button 29*b* near the bottom of the screen in FIG. 7. After this action, individual transmitters 16000006 and 16000007 can be re-assigned to Repeaters with Aliases "1" and "2" under the "Chosen" column 29*c* as seen in FIG. 8. At the bottom of the screen, command links 29*d*, 29*e*, 29*f* for three options appear:

| | |
|---|---|
| Select All | Select all transmitters for update. |
| Clear All | Clear all transmitter selections. |
| Select Diff. | Select only those transmitters with changed data for update. |

In this example, the "Select Different" link 29*f* was actuated, so only two manually altered transmitters are selected for update in data box 28 in FIG. 6, since only their chosen assignments differ from that appearing in the collector 13. FIG. 6 shows that these two transmitters have been selected for update in the collector 13. After this assignment, when a file of data is downloaded to the data collector and data is further transmitted to repeater 4001, it will recognize and process transmissions from transmitter 16000006.

Figure 9:
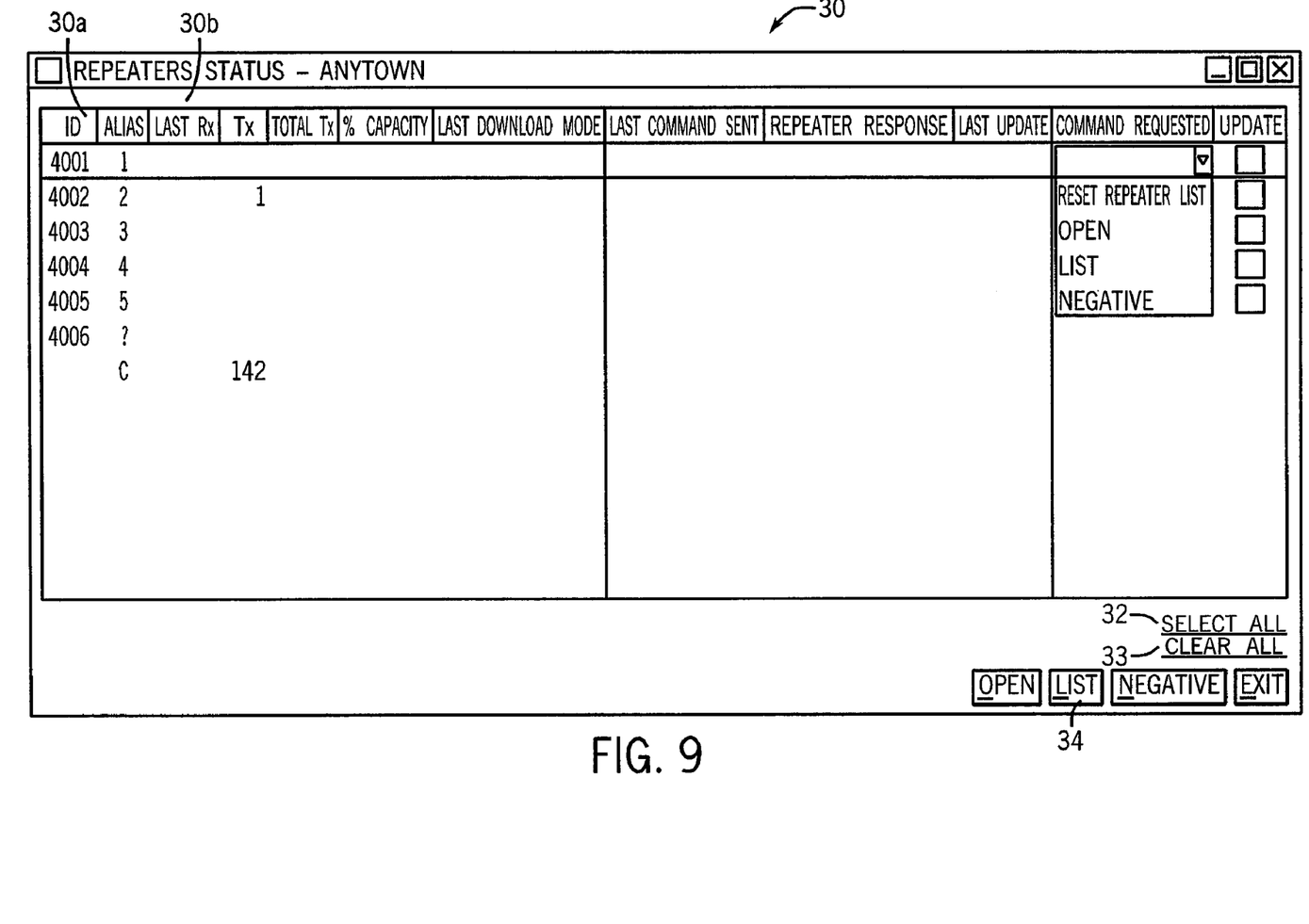

FIG. 9 shows a screen display 30 which is displayed for showing the details of the repeater status. The repeaters are listed in the ID field 30*a* and the Alias field 30*b*.

The data which can be displayed for each repeater is defined as follows:

TABLE 3

REPEATER STATUS DEFINITIONS

| Term | Definition |
|---|---|
| ID | Unique repeater identification. |
| Alias | The alias assigned by the system operator. |
| Last Rx | Date and time stamp of last transmission. |
| Tx | Number of transmitters assigned to a repeater. |
| Total Tx | Total number of transmitters assigned to the Repeater for all Collectors to which the repeater is allocated. |
| % Capacity | The percent of capacity currently assigned. |
| Last Download Mode | The mode in which the repeater was operating during the collector download operation. |
| Last Command Sent | The last command sent to a repeater during the collector download operation. |
| Repeater Response | The most recent repeater response following a collector update operation. |
| Last Update | Time stamp of the last repeater update. |
| Command Req. | The mode in which a repeater is to be set. |
| Update | Selected to update the repeater. |

At the bottom of the repeaters status screen display, command links 32,33 for two options appear:

| | |
|---|---|
| Select All | Select all repeaters for update. |
| Clear All | Clear all repeater selections. |

The three modes of repeater operation are "Open," "List" and "Negative." In the "Open" mode of operation which is used only for configuration operations, transmissions from any transmitters are accepted by the repeaters and re-transmitted to the collector. The "List" mode represents the normal mode of operation, where only transmitters on a list in the reception node, either a repeater or a collector, are received. In a Negative mode, only those transmitters that are "not on a list" are received by all reception nodes which can receive them. This is a second configuration mode, which is used for listing unassigned transmitters.

The "Open," "List" and "Negative" buttons 34*a*, 34*b* and 34*c* are operable to all listed repeaters at once. It is also possible to operate on any specific repeater using a pull-down menu with options for Reset Repeater List, Open, List and Negative.

Figure 10:
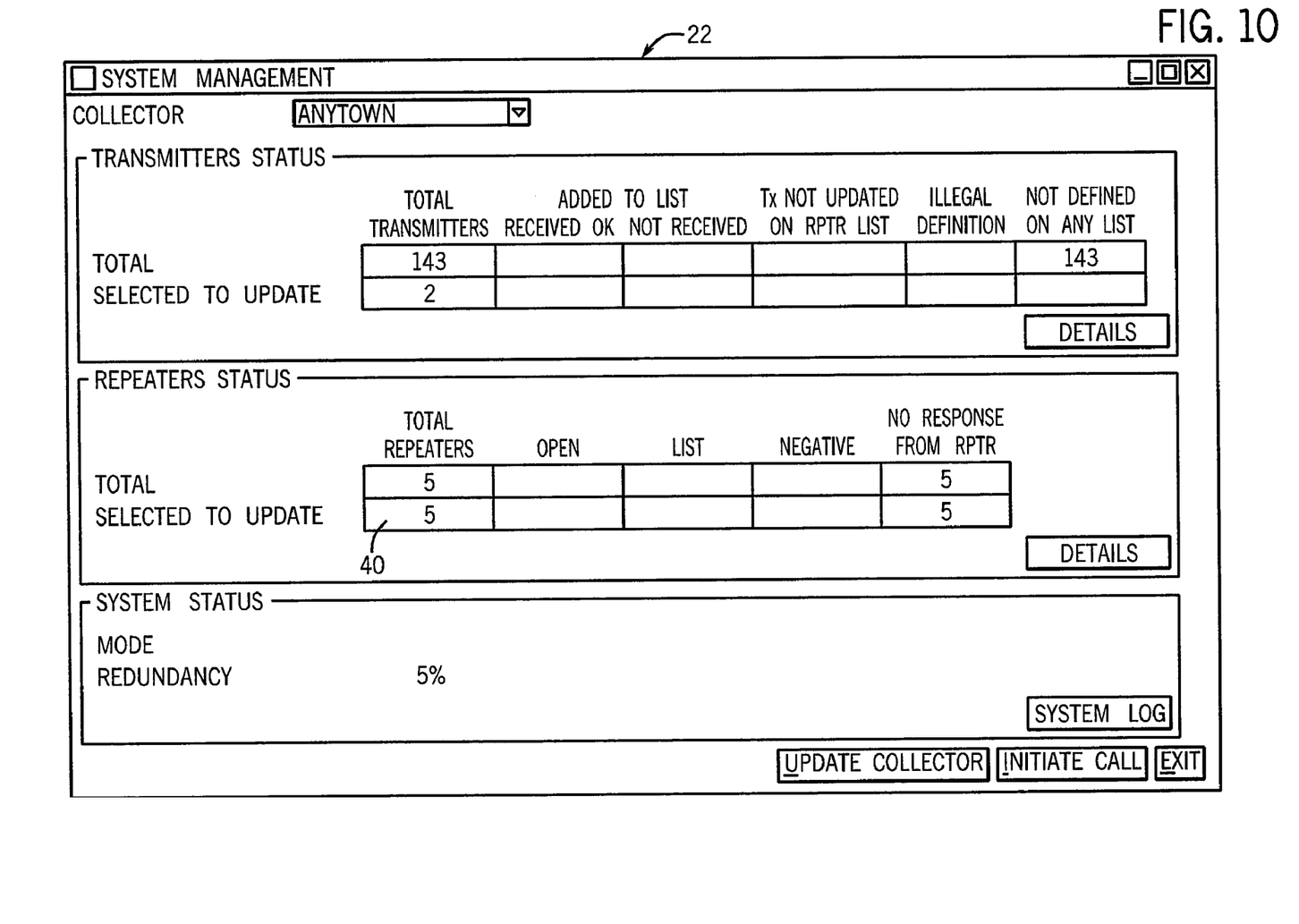

If the "List" button 34 is actuated, the system management screen display 22 is updated to show an update of five (5) repeaters in the box 40, as shown in FIG. 10. The Update Collector button is then actuated to download a file to the collector including the corresponding transmitter lists for repeaters transmitting to that collector.

Figure 11:
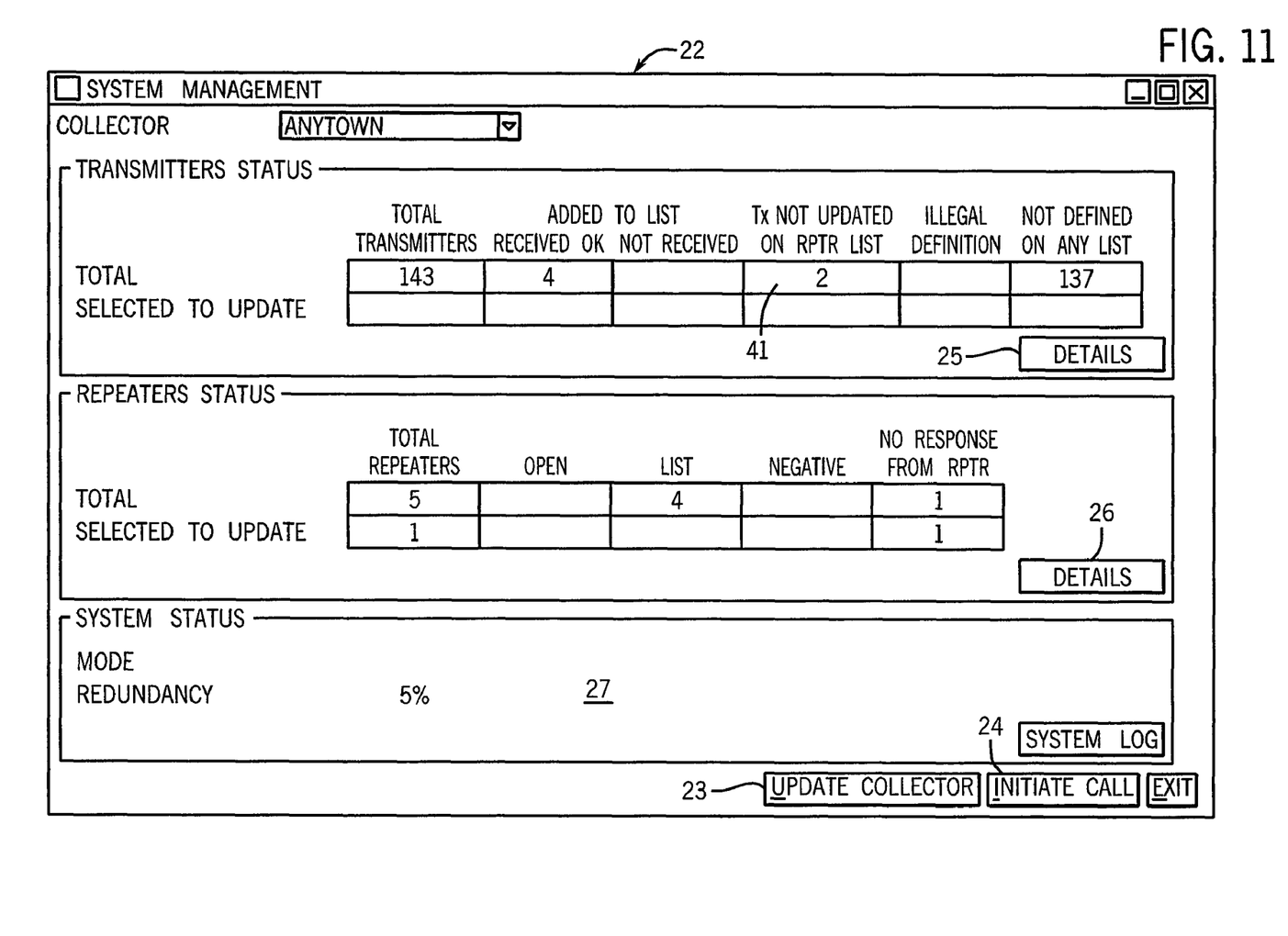

FIG. 11 shows the system management screen display 22 from FIG. 5, with data in box 41 showing that two (2) transmitters were on the repeater list when the repeater list was updated, but that the update to the repeaters has not yet occurred. The transmitter status area also shows that one hundred thirty-seven of the transmitters have not been assigned on any list. The repeater status area shows that four repeaters were put in the List mode, while one repeater selected for update did not respond.

Figure 12:
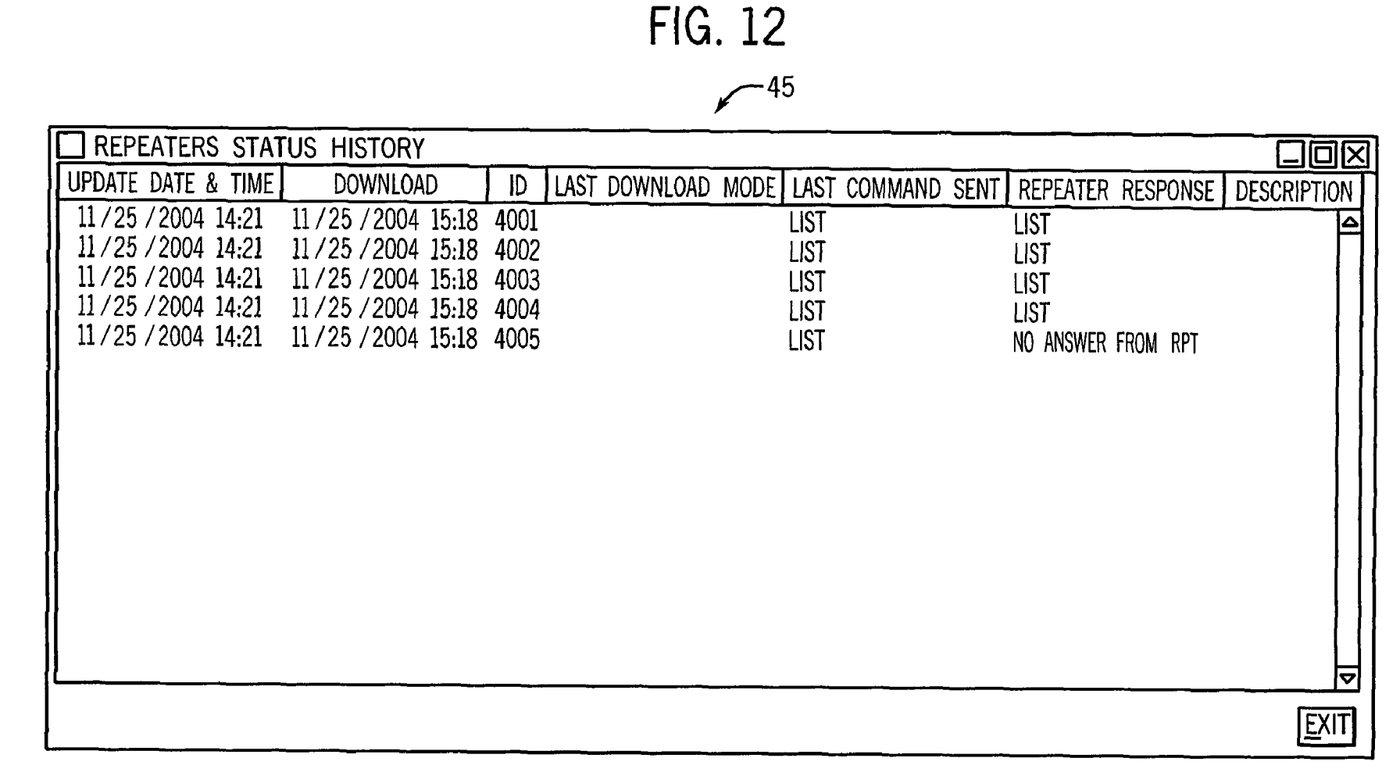

FIG. 12 shows a repeater status history screen display 45 that is displayed when the details button 26 is actuated in the system management screen display 22. This window 45 provides information to confirm the downloading of the list which assigned the two unassigned transmitters to a specific repeater and the uploading of the repeater list for examination.

If a transmitter is not assigned to a repeater, the repeater will ignore transmissions from that transmitter. In this way, path redundancy is limited to a few specific instances where signal interference is a problem, such that signals are not received by an assigned repeater within the time interval required to update meter data in the data collector.

Transmitters can be re-assigned from one repeater to another for better reception at the second repeater. This may occur when geography or reception conditions interfere with signals transmitted to the first repeater.

Figure 13:
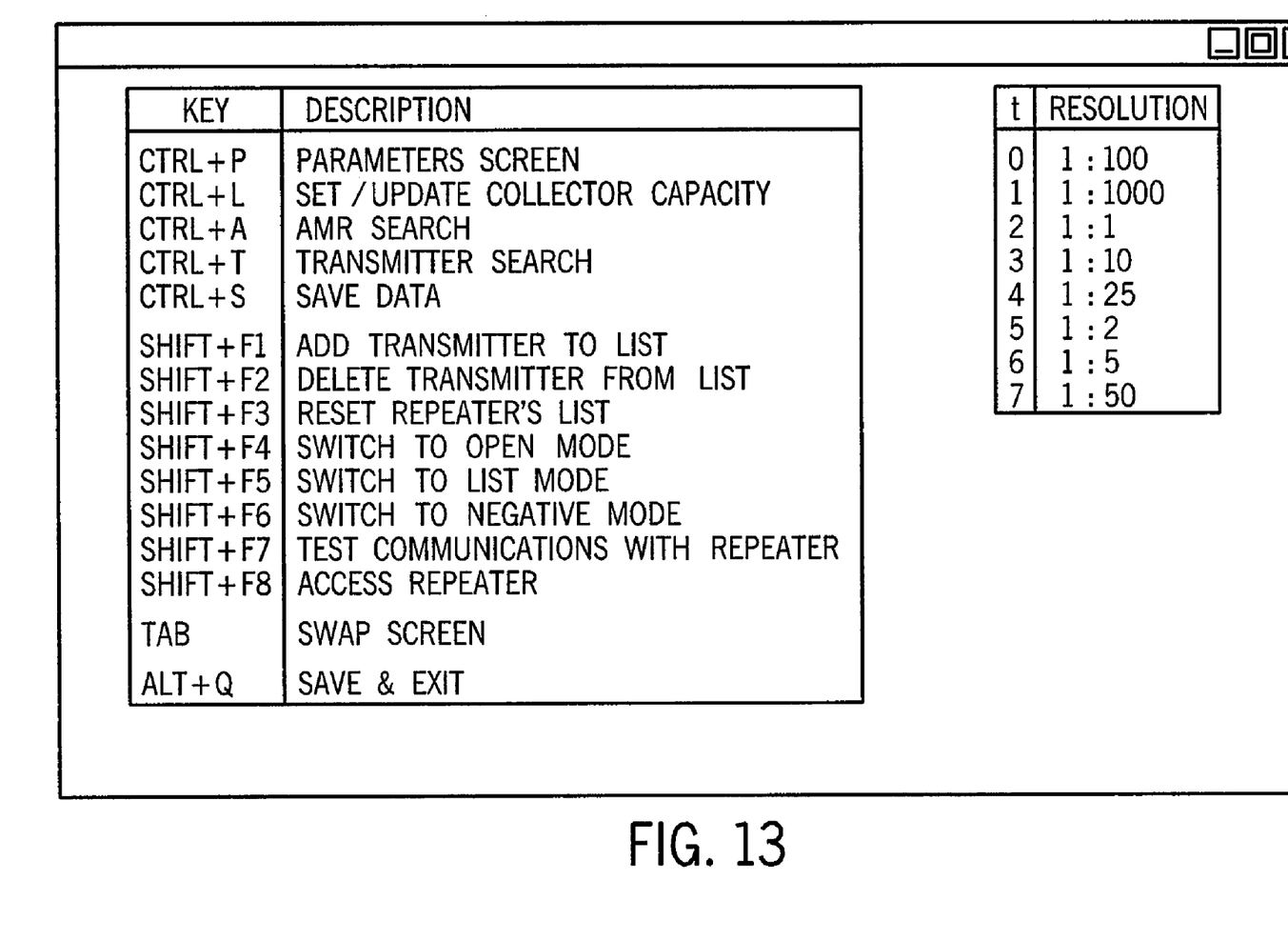
FIG. 13 is a second screen display of data and command buttons received from the data collector seen in FIG. 1.

FIG. 13 shows an added capability where commands can be executed at the collector level using an external computer connected to a port on the collector. When the F1 key is depressed a help screen display seen in FIG. 13 appears. An individual repeater is selected by entering Shift+F8. The other available commands using the Shift Key and the function keys F2-F8 are shown in FIG. 13. With these commands, a transmitter or repeater can be added or deleted to a list at the collector level. In addition the three modes of repeater operation can be initiated. Communications with a repeater can be tested. And, the repeater's transmitter list can be reset.

From this description, it should now be apparent how the invention provides the capability for managing a list of transmitters for each repeater. The invention provides the capability to manage the list of any specific repeater including the adding or deleting transmitters, resetting the list and accomplishing other housekeeping activities.

The invention also provides for identification of the existing reception path from each transmitter associated with a data collector. The invention allows reporting of both detailed and summary data on the data path(s) from each transmitter to the data collector(s). The invention allows analysis of data to determine the optimum reception path for the receipt of data from each transmitter by a system management computer.

This has been a description of several preferred embodiments of the invention. It will be apparent that various modifications and details can be varied without departing from the scope and spirit of the invention, and these are intended to come within the scope of the following claims.

We claim:

1. A method for controlling redundancy in data paths from a plurality of transmitters through reception nodes in a meter data acquisition network, the method comprising:

providing corresponding lists of transmitters assigned to respective reception nodes;

transferring the corresponding lists of transmitters to respective reception nodes;

receiving transmissions of metering data at the respective reception nodes from transmitters according to the corresponding lists of transmitters; and ignoring transmissions of metering data at the respective receivers from transmitters not on the corresponding lists of transmitters for the respective reception nodes; and wherein the reception nodes include at least one data collector and a plurality of receivers, and wherein the list of transmitters for each respective receiver is transferred from a computer to the data collector and then from the data collector to the respective receivers; and wherein the computer uploads data from the data collector, including data for calculating a percentage of path redundancy between the transmitters and the data collector.

2. The method of claim 1, wherein transmitters that are on at least two corresponding lists of transmitters are a minority of transmitters transmitting data through the respective reception nodes.

3. The method of claim 1, wherein the reception nodes include at least one data collector and a plurality of receivers, and wherein the metering data is re-transmitted from the receivers to the data collector, and wherein the metering data is transferred from the data collector to the computer.

4. The method of claim 3, wherein each receiver is a part of a repeater that also includes a transmitter, and wherein the corresponding lists of transmitters are transferred from the computer to the respective repeaters through the data collector.

5. The method of claim 4, further comprising uploading to the computer a list of repeaters assigned to the data collector.

6. The method of claim 1 further comprising uploading to the computer lists of transmitters assigned to the respective receivers and a status of transmissions being received at the receivers from the transmitters assigned to the respective receivers.

7. The method of claim 1, wherein the corresponding lists of transmitters assigned to said respective receivers are each transferred in a file of data that is downloaded from a computer to a data collector.

8. The method of claim 1, further comprising
   obtaining the list of transmitters for which transmissions are received at one of the reception nodes; and
   modifying the list to change transmitters on the list for which transmissions are received and processed by said one of the reception nodes.

9. The method of claim 8, wherein said one of the reception nodes is a data collector.

10. The method of claim 8, wherein the reception nodes include at least one data collector and a plurality of repeaters which receive metering data from transmitters and re-transmit metering data to the data collector, and wherein said one of the reception nodes is one of the receivers.

11. A networked system for controlling redundancy of data paths from a plurality of transmitters through at least two repeaters to a data collector, the networked system comprising:

a data collector for receiving utility metering data from a plurality of transmitters operating with utility meters distributed within at least a portion of a service area;

at least two repeaters that receive radio frequency transmissions with metering data from respective pluralities of transmitters, said two repeaters also re-transmitting the metering data to the data collector in radio frequency transmissions; and said repeaters each receiving from the data collector a corresponding list of transmitters assigned to the respective repeater; and said repeaters each ignoring transmissions from any of the transmitters in the pluralities of transmitters that are not on the corresponding list of transmitters assigned to the respective repeater; and a computer for exchanging data with said data collector including receiving data on transmissions received from the plurality of transmitters through said repeaters and the computer transmitting the corresponding lists of transmitters to the respective repeaters; and wherein the computer uploads data from the data collector, including data for calculating a percentage of path redundancy between the transmitters and the data collector.

12. The networked system of claim 11, wherein transmitters that are on at least two corresponding lists of transmitters are a minority of transmitters transmitting data through the respective receivers to the data collector.

13. The networked system of claim 11, wherein the computer runs applications including an application in which a user can view status data concerning lists of transmitters that are listed with respective repeaters.

14. The networked system of claim 11, wherein said application provides an ability to manage the corresponding list of any respective repeater including adding or deleting transmitters.

15. The networked system of claim 11, wherein the data collector transfers to the computer a status of transmissions being received at the respective receivers and being re-transmitted to the data collector.

16. The networked system of claim 11, wherein the transmitters are located near corresponding utility meters and receive metering data signals which are converted to radio frequency signals.

* * * * *